June 13, 1950  KUAN-HAN SUN  2,511,227
LEAD CONTAINING FLUOPHOSPHATE GLASS
Filed March 26, 1947
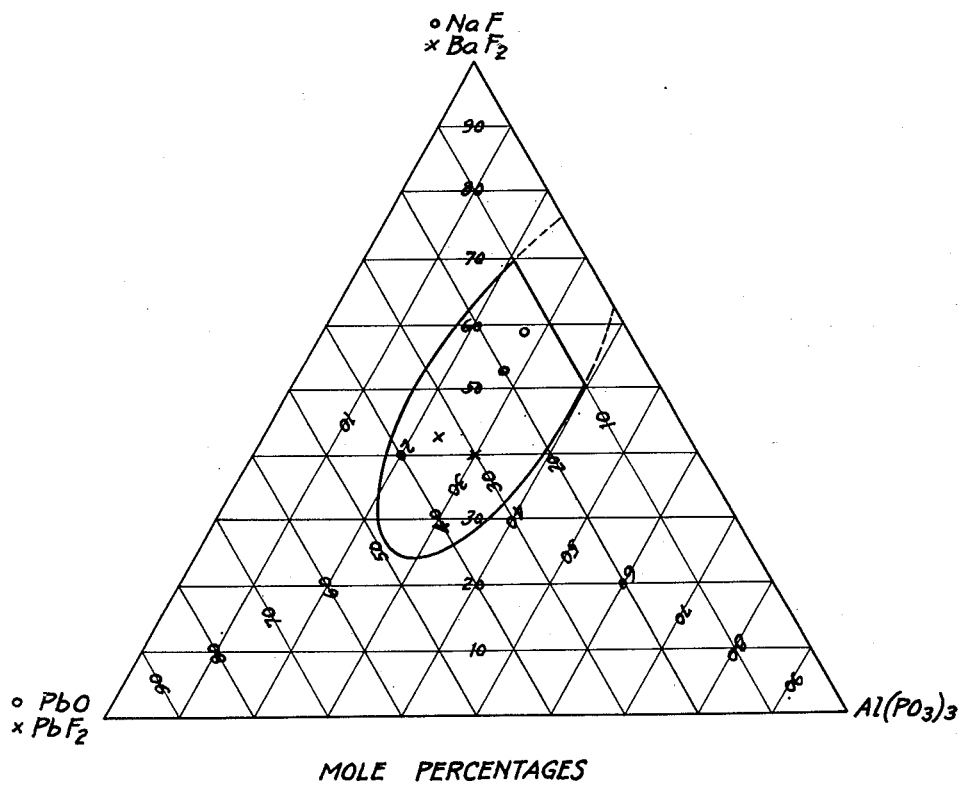
MOLE PERCENTAGES
KUAN-HAN SUN
INVENTOR Patented June 13, 1950

2,511,227

UNITED STATES PATENT OFFICE 2,511,227

LEAD-CONTAINING FLUOPHOSPHATE GLASS

Kuan-Han Sun, Pittsburgh, Pa., assignor to Eastman Kodak Company, Rochester, N. Y., a corporation of New Jersey Application March 26, 1947, Serial No. 737,341

5 Claims. (Cl. 106—47)

This invention relates to lead-containing glasses particularly to fluophosphate glasses such as described in my copending applications, Serial Numbers 644,178, now Patent No. 2,481,700, September 13, 1949, and 644,179, filed January 29, 1946.

The significant difference between those two prior cases on fluophosphate glasses is the presence or absence of alkali. The present invention is not concerned with this difference but actually contemplates either alkali-containing or alkali-free fluophosphate glasses. Both of the above mentioned applications are drawn to glasses containing little or no silicate but otherwise containing elements characteristic of glasses classically known as crown glasses, as well as the fluophosphate "anions" which replace the silicate. The presence of lead, which distinguishes flint glasses from crown glasses in the classical definitions thereof has a well known effect of lowering the Abbé value accompanied by an increase in the index of refraction. The present invention has to do with the addition of lead to fluophosphate glasses.

It is known that the addition of barium to either crown glasses or flint glasses raises the index of refraction and this effect carries over to fluophosphate glasses as indicated in an application, Serial Number 737,340, filed concurrently herewith by myself and Thomas E. Callear (which relates primarily to the use and effect of cadmium). The present invention has been found to be equally applicable to glasses containing barium as to those containing sodium. The fluorine is included as sodium fluoride or barium fluoride and may also be partly present as the lead fluoride. Alternatively the lead may be added in the form of lead oxide.

Four glasses according to the present invention are made up by melting the batches set forth in the following table in which the weight percentages are in columns headed W, and the molecular percentages are in columns headed M.

Table of compositions

|  | Example 1 | | Example 2 | | Example 3 | | Example 4 | |
|---|---|---|---|---|---|---|---|---|
|  | W | M | W | M | W | M | W | M |
| NaF | 20 | 59.6 | 17 | 54.4 | | | | |
| BaF₂ | | | | | 31.5 | 40 | 33.4 | 42 |
| PbO | 29 | 16.2 | 35 | 21.2 | | | | |
| PbF₂ | | | | | 33.0 | 30 | 36.7 | 33 |
| Al(PO₃)₃ | 51 | 24.2 | 48 | 24.4 | 35.5 | 30 | 29.9 | 25 |

Since the lead cation in glass according to the invention may alternatively be combined with oxygen or fluorine, the present invention is defined in terms of the mole percentage of lead. In the accompanying drawing the compositions are shown on a triangular diagram.

The points on the diagram represent the mole percentages. The area indicated as enclosed in the curve including the broken lines extending to the zero lead axis, indicate glasses which are susceptible to manufacture, for example without devitrification. However, since the present invention has to do with the presence of lead and since the effect of the lead is not appreciable when the mole percentage drops below 10 percent, the area is cut off along the 10 percent lead line.

In making these glasses, ingredients which give off water vapor or other gases during heating should not be used because the gas substances during vaporization carry fluoride away from the melt. The powdered and dried materials are mixed thoroughly and placed in a covered platinum vessel. The cover is important because it keeps the volatilization loss to a minimum. Whereas fluophosphate glasses in general require melting temperatures about 1000° C. or higher, these glasses containing lead may be melted at 800° C. At this temperature the volatilization is not severe. On the other hand higher temperatures may be used to increase the rate of initial melting. The liquid is shaken to uniformity and poured into a mold previously heated to about 400° C. A clear glass durable against moisture attack is obtained.

In the third and fourth examples it has been found preferable to melt all the components other than the lead fluoride first and then to add the lead fluoride to the liquid melt with stirring or shaking.

Example 1 has an index of refraction for the D line of 1.5138 and an Abbé value V=54.8. Example 2 has an index of refraction for the D line of 1.5950 and an Abbé value of V=46.3. The third and fourth examples resemble the barium flint glasses but with somewhat higher Abbé values ranging from 45 to 60 with an index of refraction about 1.6 or even up to 1.63. It will be noted that Examples 3 and 4 are alkali-free fluophosphate glasses which appears to raise the blue partial dispersion, but no direct comparison has yet been made with respect to this particular property of these glasses.

Having thus described four preferred examples of my invention, I wish to point out that it is

I claim:

1. A fluophosphate optical glass consisting of the fused heat reaction product of a batch containing the following molecular percentages: sodium fluoride between 50 and 70, aluminum metaphosphate between 15 and 40 and lead oxide between 10 and 30.

2. A fluophosphate optical glass consisting of the fused heat reaction product of a batch containing the following molecular percentages: barium fluoride between 25 and 50, aluminum metaphosphate between 15 and 40 and lead fluoride between 20 and 50.

3. A fluophosphate optical glass consisting of the fused heat reaction product of a batch containing as predominant and essential ingredients in the molecular percentages specified: aluminum metaphosphate, 15 to 40 per cent; a fluoride selected from the group consisting of the fluorides of sodium and barium, 25 to 70 per cent; a compound of lead selected from the group consisting of lead oxide and lead fluoride, 10 to 50 per cent.

4. An alkaline-metal-free fluophosphate optical glass of the type consisting of the fused heat reaction product of a batch consisting of compatible materials and comprising essentially the following ingredients in molecular proportions: barium fluoride, 25 to 50 per cent; aluminum metaphosphate, 15 to 40 per cent; lead fluoride 20 to 50 per cent.

5. A fluophosphate optical glass consisting of the fused heat reaction product of a batch consisting essentially of an aluminum metaphosphate, 15 to 40 mole per cent, sodium fluoride, 50 to 70 mole per cent, and at least one lead compound selected from the group consisting of lead oxide and lead fluoride, 10 to 30 mole per cent, and all mutually compatible in glass compositions.

KUAN-HAN SUN.

No references cited.